United States Patent
Antonucci (10) Patent No.: US 10,950,371 B2
(45) Date of Patent: Mar. 16, 2021

(54) NONMETALLIC PUSH-IN CONNECTOR

(71) Applicant: Mark Antonucci, Hampstead, NC (US)

(72) Inventor: Mark Antonucci, Hampstead, NC (US)

( * ) Notice: Subject to any disclaimer, the term of this patent is extended or adjusted under 35 U.S.C. 154(b) by 265 days.

(21) Appl. No.: 15/281,864

(22) Filed: Sep. 30, 2016

(65) Prior Publication Data

US 2017/0018338 A1     Jan. 19, 2017

Related U.S. Application Data (63) Continuation-in-part of application No. 14/731,126, filed on Jun. 4, 2015, now abandoned.

(51) Int. Cl.
*H01B 17/58*     (2006.01)
*H02G 3/08*     (2006.01)
*H01R 13/58*     (2006.01)

(52) U.S. Cl.
CPC .......... *H01B 17/583* (2013.01); *H02G 3/083* (2013.01); *H01R 13/5816* (2013.01); *H01R 13/5837* (2013.01)

(58) Field of Classification Search
CPC ......... H02G 3/0691; H02G 3/083; H02G 3/22
See application file for complete search history.

(56) References Cited

U.S. PATENT DOCUMENTS

| | | | | |
|---|---|---|---|---|
| 3,056,852 A | * | 10/1962 | Sachs | H01R 13/585<br>16/2.5 |
| 4,089,496 A | * | 5/1978 | Mizusawa | H02G 3/0633<br>16/2.1 |
| 7,049,515 B1 | * | 5/2006 | Collins | H02G 3/083<br>16/2.1 |
| 8,357,854 B2 | * | 1/2013 | Thompson | B29C 45/44<br>174/77 R |
| 9,425,596 B2 | * | 8/2016 | Laverdiere | H02G 3/083 |

OTHER PUBLICATIONS

Wikipedia entry for American wire gauge, retrieved Dec. 18, 2018; https://en.wikipedia.org/wiki/Annerican_wire_gauge.*
http://www.homedepot.com/b/Electrical-Electrical-Boxes-Conduit-Fittings-Conduit-Fittings/Connector/N-5yc1vZbohkZ1z117wu; 3/8 in. Non-Metallic (NM) Twin-Screw Cable Clamp Connectors.
http://www.cableorganizer.com/arlington-industries/black-button-wire-connector/?gclid=CO6-5NPI4NECFdgKgQodhbUAHA&gcssku=AI-NM94&ef_id=VtLpuwAAAZqT0h-n:20170126194152:s; Arlington Industries Black Button Non-Metallic Wire Connectors.

* cited by examiner

*Primary Examiner* — Ross N Gushi
(74) *Attorney, Agent, or Firm* — Russell D. Nugent; The Humphries Law Firm, P.C.

(57) ABSTRACT

A push-in connector generally having an interior channel equipped with longitudinal protrusions that run at least part of the length of the interior channel of the connector body to define grooves through which wires of a different gauges can be inserted. When the user rotates the connector body about its longitudinal axis, the interior channel defines a second gauge through which a wire of a second gauge can pass. The connector body has one or more incisions cut into one end of the connector body and a separate cuff that fits over the feed end. The interior channel contains teeth that grip the wire(s) or cable(s) once inserted. The exterior of the connector body has flexible exterior protrusions that can be pushed down when inserting the connector through the knock-out of a housing and spring back into place to secure the connector to the housing.

13 Claims, 6 Drawing Sheets

NONMETALLIC PUSH-IN CONNECTOR

CROSS-REFERENCE TO RELATED APPLICATIONS

This application claims the benefit of priority to and is a continuation in part of U.S. application Ser. No. 14/731,126 filed on Jun. 4, 2015. The content of U.S. application Ser. No. 14/731,126 filed on Jun. 4, 2015 is incorporated by reference herein in its entirety.

BACKGROUND OF THE INVENTION

1. Field of the Invention

The present disclosure is in the technical field of connectors used in installing wiring. More specifically, the present disclosure is directed towards a push-in connector commonly used in wiring electrical housings, such as lighting fixtures, wiring compartments, splice boxes, etc. Even more particularly, the present disclosure is directed towards nonmetallic push-in connectors commonly used to install wiring into a residential light fixture, specifically into a fixture featuring a ⅜ inch knock-out.

2. Background Art

Throughout this specification, specific reference will be made to units of measurement defined and standardized by the American Wire Gauge system that has been widely adopted in North America and throughout the United States. For example, the cables most commonly used to wire residential light fixtures are referred to by American electricians as 14/2 AWG wires or cables and 12/2 AWG wires or cables. The American Wire Gauge system specifically defines the terms 14 gauge and 12 gauge as cables with a particular cross section, area, resistance, conductivity and fusing current. More specifically, 12 gauge cables or wires have a diameter of 0.0808 inches or 2.053 millimeters while 14 gauge cables or wires have a diameter of 0.0641 inches or 1.628 millimeters. In addition, cable manufacturers often bundle wires and cables and electricians refer to bundled cables first by their size or gauge and second by the number of wires in the bundle. For example, 14/2 AWG cables have two 14 AWG cables bundled together[1]. The term 12/2 cable refers to a non-metallic sheathed bundles of two 12 solid AWG wires. Throughout the specification and claims, when a size of wire is referred to, the inventor is specifically referring to the American Wire Gauge system.

[1] 14/2 is a nonmetallic (NM) sheathed bundle (-B) of two solid 14 AWG wires.

Electrical wiring can take a variety of forms, but there are two more commonly used types: non-metallic (NM) wiring and metal-clad (MC) wiring. Nonmetallic wiring is used for approximately 90% of all residential uses when wiring light fixtures. In addition, it is common for light fixtures to be installed underneath cabinets. Generally, cabinets are designed to include a decorative ledge or lip that hangs down from the lower edge of the cabinet and thus conceals or partially conceals anything mounted to the undersurface of the cabinet.

A commercial or residential light fixture of the type being discussed will typically come in different sizes and styles, but flat fixtures with a low profile are becoming more common. These light fixtures have a metal or plastic housing that holds the various electrical components. The housing typically contains circular portions, called knock-outs, which are meant to be removed so that wiring can enter or leave the housing. These knock-outs are different sizes depending on the size of the light fixture. For example, many light fixtures meant to be mounted under a cabinet or shelf are approximately 1.5 inches tall and contain several ½ inch knockouts (that are actually about ⅞ inches in diameter). Those with lower profiles will have ⅜ inch knock-outs that usually measure closer to a half-inch in diameter. Typically these knock-outs are removed or knocked out and a connector piece is inserted through which wires are run into the lighting fixture.

In addition, there are a number of electrical connectors in the prior art. One of the more common types of connector consists of a metal housing that has an end meant to accept a wire coming into the fixture, the feed end, and an opposite end from which the wire leaves the connector and enters the housing of the light fixture, the lead-in end. The feed end consists of an opening in the metal connector and a metal plate fixed over the opening that is fixed to the body of the connector with two screws. The screws tighten a metal plate down on wires that have been fed through the connector. The lead-in end will fit into the light fixture's metal housing and the outside of the lead-in end will typically have threads complementary to threads on a metal nut. The metal nut is screwed onto the lead-in end to tighten and hold the connector into place once inserted through the knock-out opening.

This type of connector has several disadvantages. First and foremost, it is cumbersome to install. Installation of this type of connector involves using two different tools, a screwdriver to tighten the screws over the metal plate on the feed end and a wrench to hold the nut while the nut is screwed over the end of the lead-in end. In addition, as earlier mentioned, there is a growing trend towards using smaller light fixtures that have a lower profile when mounted under a cabinet or shelf. As a result, the housings are smaller or thinner and make inserting one's hands into the housing to hold or turn the nut that fits onto the lead-in end much more difficult. Moreover, the connectors must be smaller in diameter to fit into the holes left by the knock-outs, making them more difficult to manipulate.

In addition, when being screwed over the lead-in end, the nut can catch on a flange or lip of the light fixture housing making screwing the nut onto the connector more difficult. Moreover, since it may be easier to hold the nut in place and turn the rest of the connector during installation, it can be difficult to orient the connector such that it is securely attached to the nut and the screws on the feed end are oriented in a direction making the accessible to a screwdriver. The difficulty in installing these connectors leads some contractors to take a short cut and simply wire the fixture without them, resulting in a less safe installation.

In addition, since these connectors use screws and a threaded end fitted with a nut, they are bulky and take up enough space such that it can be difficult or impossible for the light fixture to be mounted flush against both the wall and the cabinet or shelf under which they are installed. Finally, there is also a growing trend towards using plastic housings in these types of light fixtures. Using a metal connector in a plastic housing would require the connector to be grounded.

Another example of a connector known in the prior art is the Arlington Industries NM94 Black Button Non-Metallic Push-In Connector. This connector avoids many of the above problems presented by the metallic connector as it is nonmetallic and does not require tools to install. However, while the Black Button Push-In Connector comes in a variety of sizes, it currently does not come in a size that fits into ⅜ inch knock outs. Additionally, in its current design, the Black Button Push-In Connector will not accommodate more than one size of wire in a ⅜ inch connector. Finally, because the overwhelming majority of residential wiring uses two gauges of wires, there is a need in the field for a versatile nonmetallic connector that can accommodate more than one gauge of wiring.

The current application generally discloses a connector that is designed to accept more than one gauge of wire when the connector body is rotated about its longitudinal axis. More specifically, the current application discloses a push-in connector that is designed to accommodate a single or double 14/2 AWG cable or alternately, a single 12/2 AWG cable. In alternate embodiments, a 10/2 AWG cable can be substituted for one of the other sizes of cables. The connector does not require any tools to install other than the user's own two hands. Moreover, a skilled artisan could use one connector to install both of the most common sizes of wiring used in residential lighting fixtures.

BRIEF SUMMARY OF THE INVENTION

The disclosed connector consists of a generally cylindrical body with two ends. While the connector can be made of metal or any other suitable material, generally it will be made of a non-metallic material. One end, the feed end, is adapted to receive and securely grip or hold in place the cables or wires entering the electrical device. The other end, the lead-in end, is adapted to be inserted into the metal or plastic housing of an electrical fixture and is equipped with means to secure the connector to the housing.

The connector body includes an interior channel through which wires or cables can pass. In general, the interior channel can be configured to accept wires or cables of two or more different sizes or gauges. In a preferred embodiment the interior channel features longitudinal protrusions that run at least part of the length of the interior channel of the connector body. These longitudinal protrusions form or define grooves that guide wires or cables through the connector body and hold those wires or cables securely in place. In a preferred embodiment, said grooves can be sized to accommodate up to two 14/2 AWG cables. Alternate embodiments may accommodate two single cables or wires of the same gauge inserted side by side. Furthermore, the longitudinal protrusions do not completely enclose the grooves and thus define a space which is configured or sized to accommodate and secure a different or second size or gauge of wire or cable inserted by rotating the connector body about its longitudinal axis. In a preferred embodiment, a 12/2 AWG gauge cable can be inserted into the space in the connector body after the connector body is turned approximately 90 degrees about its longitudinal axis. In this preferred embodiment, the 12/2 AWG cable will be in contact with the inside walls of the grooves in one axis or direction and the protrusions lining the interior of the longitudinal channel in a second axis or direction. Therefore, a single connector can be used to securely accommodate both 12/2 AWG gauge cables and 14/2 AWG gauge cables.

Furthermore, in a preferred embodiment, the longitudinal protrusions that define the grooves do not run the entire length of the interior of the connector body, i.e., the lead-in end is a hollow cavity without grooves or longitudinal protrusions in it. This structure allows for easier insertion of the wires through the body of the connector as there is less friction between the cable insulation and the connector when the protrusions are shorter than the length of the longitudinal channel.

In another preferred embodiment, means to further secure the wires inside the body of the connector include an incision cut into the feed end and a separate cuff that fits over and compresses the feed end of the connector. The incision allows the body of the connector to flex as the wires or cables are inserted into it while the cuff is used to tighten the feed end over the inserted wires or cables by sliding over the feed end and applying inward pressure to the connector body and wires or cables inside. As a result of the cuff fitting over the feed end and compressing that end when the wires or cables are inserted through it, the wires or cables are held in place without the use of a threaded nut on the lead-in end. In addition, the interior channel of the connector body can contain gripping teeth or protrusions that help to grip the jacket of the wires or cables once inserted.

Furthermore, the exterior of the connector body at the lead-in end can have exterior protrusions that are flexible and can be pushed down when inserting the connector through the knock-out of an electrical housing. Those exterior protrusions then spring back into place once there is no more downward pressure being applied to them and as a result they prevent the connector from being easily pulled back out of the knock-out opening. The exterior protrusions contact the interior of the housing while an annular flange on the exterior of the connector body contacts the opposite side of the same housing. Between the flange and the exterior protrusions, the connector is securely held to the housing. The thickness of the housing of a standard light fixture will vary depending on whether they are metallic or plastic. In other words, metal housings tend to be thinner and plastic housings tend to be about three times thicker. The connector disclosed in this application can contain one or more sets of exterior protrusions spaced at different distances from the flange to allow one connector to secure to more than one size of housing.

DETAILED DESCRIPTION OF THE INVENTION

Figure 1:
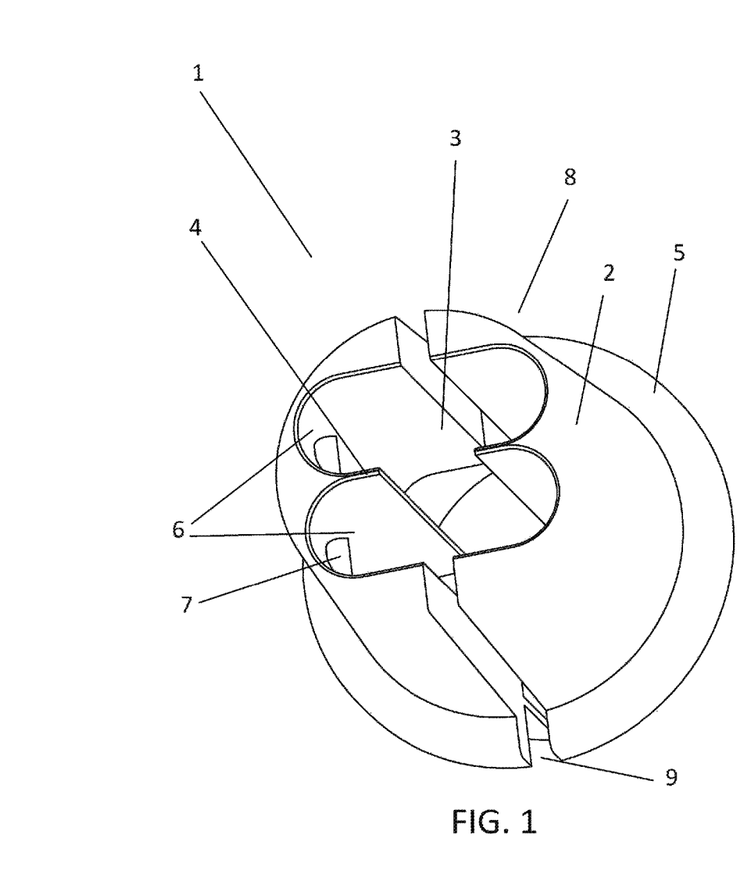
FIG. 1 is a perspective view of the feed end of the connector.
Figure 2:
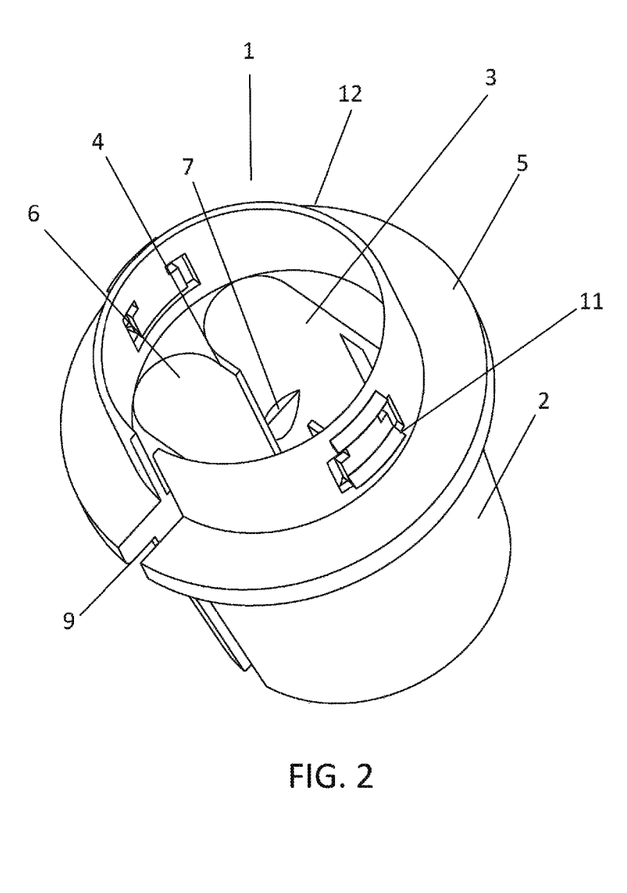
FIG. 2 is a perspective view of the lead-in end of the connector.

Referring now to the invention in more detail, FIGS. 1 and 2 show perspective views of an embodiment of the disclosed connector. More specifically, the push-in connector, generally 1, has a body 2. Note, those skilled in the art can immediately appreciate that the body of the connector can be any shape needed to fit into an electrical housing. Since most electrical housings for residential electrical enclosures and lighting fixtures have circular knock-outs, the connector body 2 is shown to be generally cylindrical. FIG. 1 is a perspective view showing the feed end 8 of the connector. FIG. 2 is a perspective view showing the lead-in end of the connector 1. The connector body 2 has an interior channel 3 running the longitudinal length of the connector body 2. In one embodiment of the disclosed connector, the interior channel 3 of the connector body 2 contains one or more longitudinal protrusions 4. The longitudinal protrusions 4 extend longitudinally along at least part of the interior channel 3 of the connector body 2, and in at least one embodiment, extend along the interior channel 3 of the connector body 2 until a point adjacent to an annular flange 5 on the exterior of the connector. The longitudinal protrusions 4 form grooves 6 through which wires or cables of a particular size or gauge can be inserted. As can be seen in FIGS. 1 and 2, the longitudinal protrusions 4 define grooves 6 that are not completely enclosed. As a result, the longitudinal protrusions form a space 15 that can securely and snugly accommodate cables or wires inserted into that space by turning the body of the connector approximately 90 degrees before insertion. In addition to the longitudinal protrusions 4 running along the interior channel 3 of the connector body 2, the interior channel 3 can contain one or more teeth 7 located inside the grooves 6 such that they can grip and help secure wires inserted through the grooves 6.

Furthermore, there is an annular flange 5 that extends along the exterior circumference of the connector body 2. There is at least one incision 9 running longitudinally with the axis of the connector body 2 and traversing the cylindrical body from the interior channel 3 to the exterior of the connector body 2. In a preferred embodiment, one or more incisions 9 are located in the exterior of the connector body 2 near the feed end 8 of the connector. These incisions 9 make the connector body 2 more flexible when a user inserts one or more cables into the connector body 2. The feed end 8 is equipped with a removable cylindrical cuff 10 (not shown in FIGS. 1 and 2). In another preferred embodiment of the connector 1, the exterior of the connector body 2 features one or more exterior protrusions 11 extending outward from the exterior of the connector body 2 and spaced away from the flange such that the exterior protrusion(s) 11 are closer than the flange 5 to the lead-in end 12 of the connector body 2.

When using the connector 1 to install electrical wiring or cables, the lead-in end 12 of the connector body 2 is inserted into the housing 13 of an electrical device (not shown) such as a lighting fixture, splice box, junction box, etc. The lead-in end 12 is inserted through the knock-out of a housing 13 until the flange 5 contacts the outer surface of the housing. The exterior protrusion(s) 11 on the exterior of the connector body 2 near the lead-in end 12 pass through the knock-out until they are positioned on the inside of the housing 13 opposite the flange 5. The exterior protrusions 11 are flexible and can be pushed down and out of the way as they pass through the electrical housing 13. When the exterior protrusions 11 emerge from the other side of the knock out and housing 13 they spring back into place and contact the inside of the housing 13. As a result, the connector body 2 is held securely to the housing 13 by the flange 5 and the exterior protrusion(s) 11 on the exterior of the connector body 2 near the lead-in end 12.

During installation, one or more wires or cables are inserted through the separate cuff 10 and then into the interior channel 3 of the connector body 2 beginning at the feed end 8. Note the cuff 10 is generally cylindrical, but can be any shape necessary to fit over the connector body 2. The longitudinal protrusions 4 in the interior channel 3 of the connector body 2 serve to guide the wires or cables through the interior channel 3 of connector body 2 and help hold the wires or cables in place once inserted. Through trial and error, the inventor has discovered the wires and cables pass through the connector body most easily when the longitudinal protrusion(s) 4 do not run the full length of the interior channel 3. In a preferred embodiment, the longitudinal protrusions 4 extend longitudinally along the interior channel 3 of the connector body 2 until a point adjacent to the flange 5 on the exterior of the connector. The wires or cables are fed through the interior channel 3 of the connector body 2 until they exit through the lead-in end 12. The user then attaches the separate cylindrical cuff 10 over the feed end 8 including the incision(s) 9 of the connector body 2. Since the interior circumference of the cylindrical cuff is either equal to or less than the exterior circumference of the connector body 2, the cuff 10 applies pressure to the exterior of the connector body 2 over the feed end 8 thus securing the wires inside the connector body 2.

Figure 3:
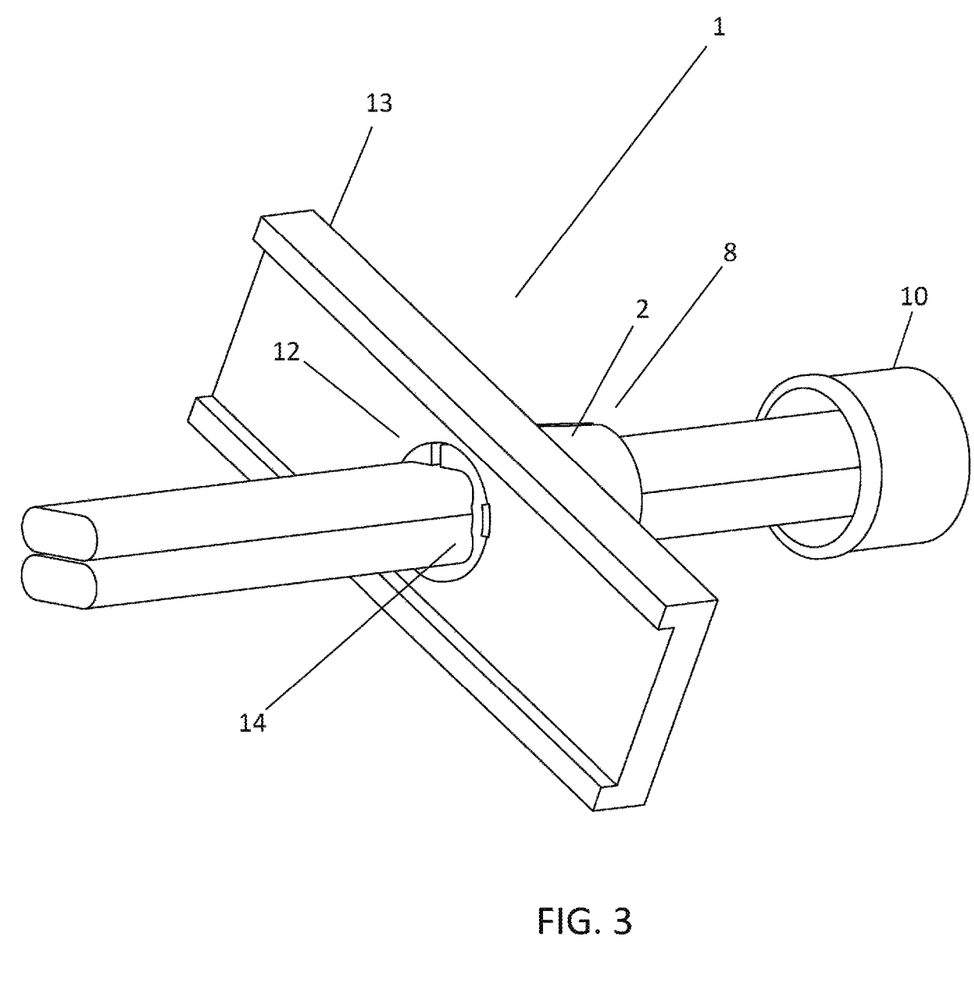
FIG. 3 is an orthogonal view of the connector system with two 14/2 AWG cables inserted through the connector.

Referring now to the invention in more detail, FIG. 3 shows a preferred embodiment of the connector, generally 1, with two cables of a first gauge 14 inserted through the interior channel 3 of the connector body 2. In this embodiment, the longitudinal protrusions 4 define grooves 6 into which wires of a first size or gauge fit securely. When this applicant uses the phrase "fits securely" or "snugly" the Applicant means the cables are held in place snugly enough by the physical structures, i.e. the grooves 6 and the longitudinal protrusions 4, that the cables cannot be easily removed from the connector body. More specifically, when cables of a first gauge are inserted into the interior channel 3, the grooves 6 formed by the interior of the body and the longitudinal protrusions 4 contact and snugly secure the wire(s) or cable(s) in more than one dimension, direction or axis, i.e., the wire(s) or cable(s) contact the inner surface of the grooves 6 as well as longitudinal protrusions 4 and are thereby securely held in place from more than one side or angle.

In a preferred embodiment, the first gauge is 14/2 AWG. When using the connector system 1 to install 14/2 AWG wiring into an electrical housing 13, the lead-in end 12 of the connector body 2 is inserted into the housing of an electrical device 13 such as a lighting fixture, splice box, junction box, etc. as described above. During installation, cables are inserted through the cuff 10 and then into the interior channel 3 beginning at the feed end 8. Longitudinal protrusions 4 (not shown) in the interior channel 3 of the connector body serve to guide the cables through the connector body 2 and hold the cables in place once inserted. The cables are fed through the interior channel 3 of the connector body 2 until they exit through the lead-in end 12. The user then attaches the separate cuff 10 over the feed end 8 including the incision(s) 9 (not shown) of the connector body 2. Since the interior circumference of the cuff is either equal to or less than the exterior circumference of the cuff 10, the cuff 10 applies pressure to the exterior of the connector body 2 over the feed end 8 thus further securing the cables inside the connector body 2.

Figure 4:
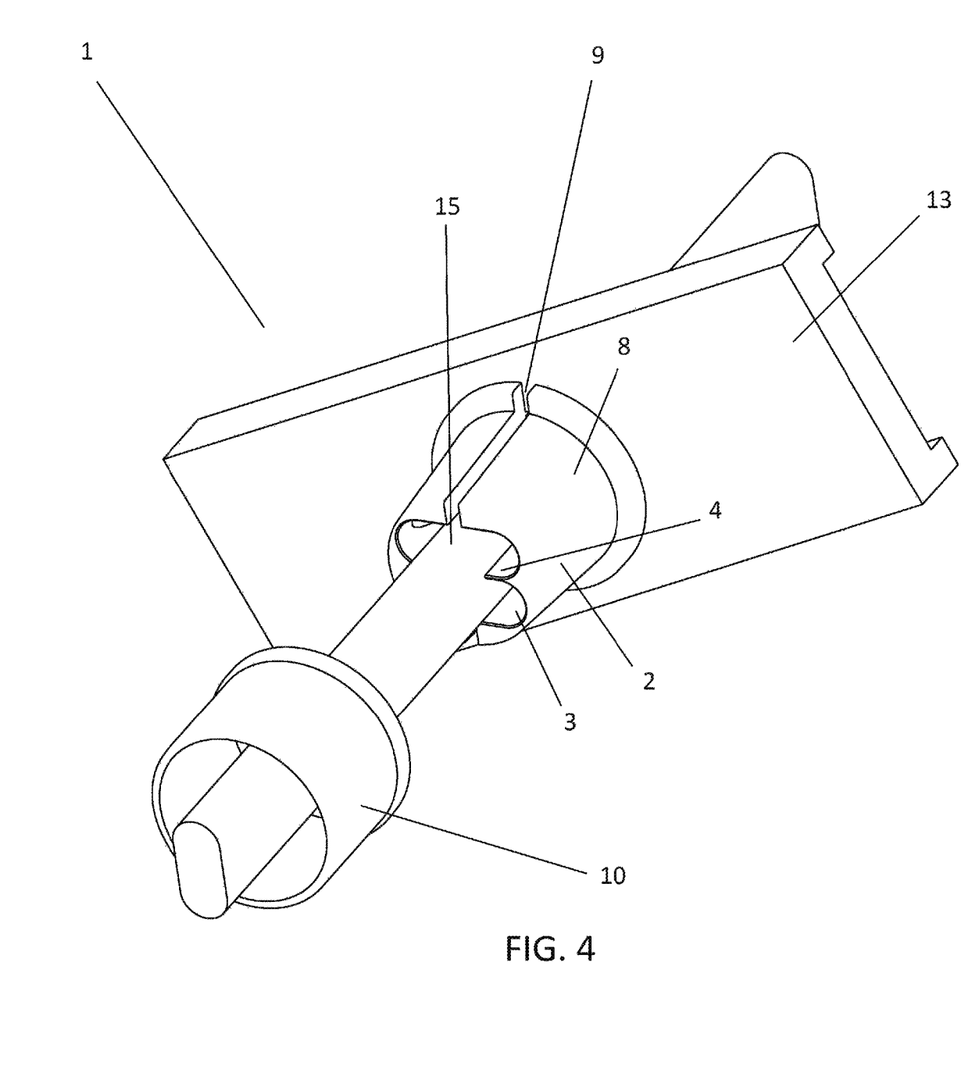
FIG. 4 is an orthogonal view of the connector system with one 12/2 AWG cable inserted through the connector.

Referring now to the invention in more detail, FIG. 4 shows the connector system 1 with a single cable of a particular gauge inserted through the interior channel 3 of the connector body 2. In a preferred embodiment, the gauge is 12/2 AWG cable. The connector system 1 is able to accommodate a cable of a second gauge by rotating the connector body 2 about its longitudinal axis and inserting the cable of a second size or gauge into the space 15 between the two longitudinal protrusions. In the case of the embodiment meant to accommodate two 14/2 AWG cables or a single 12/2 AWG cable, the connector body 2 is rotated approximately ninety degrees (90°). As mentioned above, the interior channel 3 of the connector includes one or more longitudinal protrusions 4 running lengthwise along the interior channel 3 of the connector body 2. Moreover, the longitudinal protrusions 4 are discrete or separate and do not enclose the spaces through which the wires pass. As a result, when the user rotates the connector body 2 ninety degrees (90°) about its longitudinal axis, the space 15 between the two longitudinal protrusions can accommodate and snugly secure a wire of a second size or gauge. More specifically, the cable of a second gauge is snugly secured into the connector by being in contact with the interior of the grooves 6 as well as the longitudinal protrusions 4 and is secured in place by being held by the connector in more than one direction, axis or dimension.

Furthermore, in alternate embodiments, the longitudinal protrusions 4 can be any size or shape and can be present or absent from the interior channel 3 such that the interior channel 3 can accommodate wires of two or more sizes or gauges.

In a preferred embodiment, the second gauge cable is a 12/2 AWG cable. When using the connector 1 to install 12/2 AWG cable into an electrical housing 13, the lead-in end 13 of the connector body 2 is inserted into the housing 13 of an electrical device such as a lighting fixture, splice box, junction box, etc. as described above. During installation, a single 12/2 AWG cable is inserted through the cuff 10 and then into the interior channel 3 beginning at the feed end 8. The cable is fed through the interior channel 3 of the connector body 2 until it exits through the lead-in end 12 (not shown). The user then attaches the separate cuff 10 over the feed end 8 including the incision(s) 9 of the connector body 2. Since the interior circumference of the cuff 10 is either equal to or less than the exterior circumference of the body 2, the cuff 10 applies pressure to the exterior of the connector body 2 over the feed end 8 thus securing the wires inside the connector body 2.

Figure 5:
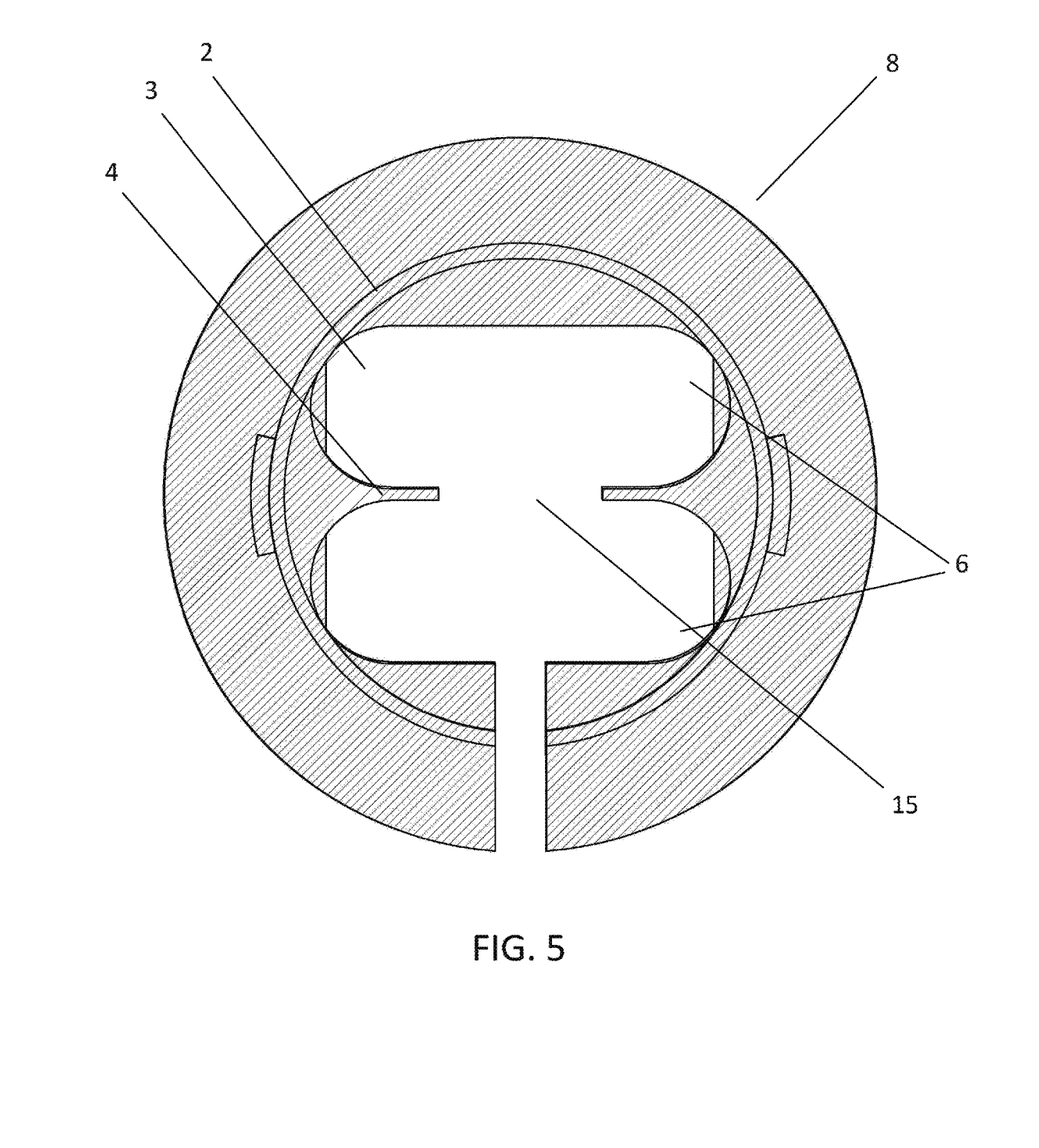
FIG. 5 is a bottom view of the connector.

Referring now to a preferred embodiment in more detail, FIG. 5 shows the feed end 8 of the connector body 2. In this embodiment, the interior channel 3 of the connector body 2 includes two longitudinal protrusions 4. The longitudinal protrusions 4 define two grooves 6 through which wires of a first gauge 14 can be inserted. As discussed earlier, the grooves 6 are not enclosed. As a result, when the user rotates the connector body 2 ninety degrees (90°) about its longitudinal axis, the space 15 between the two protrusions defines a second channel through which a wire of a second gauge can pass and be held snugly and/or securely.

Figure 6:
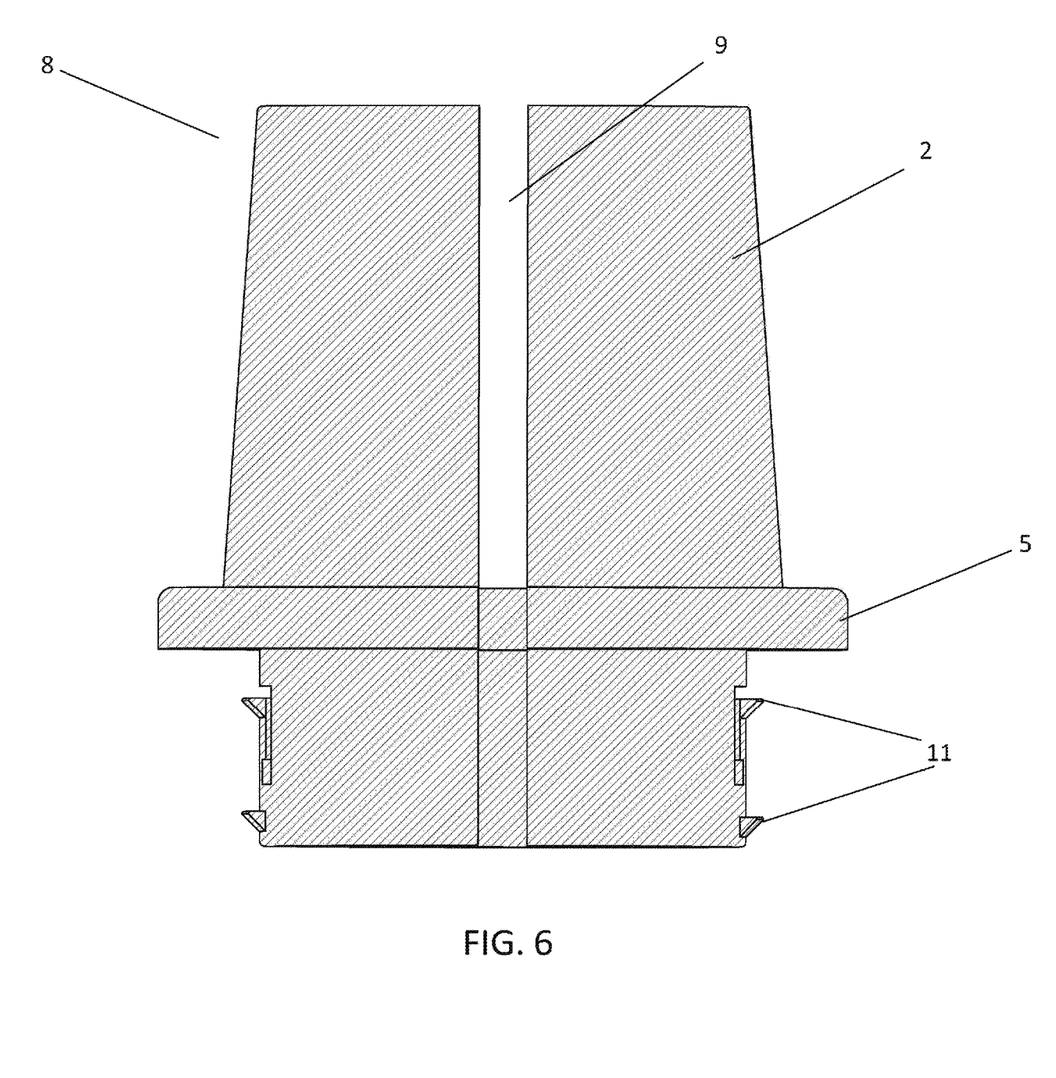
FIG. 6 is a side view of an embodiment of the connector.
Figure 7:
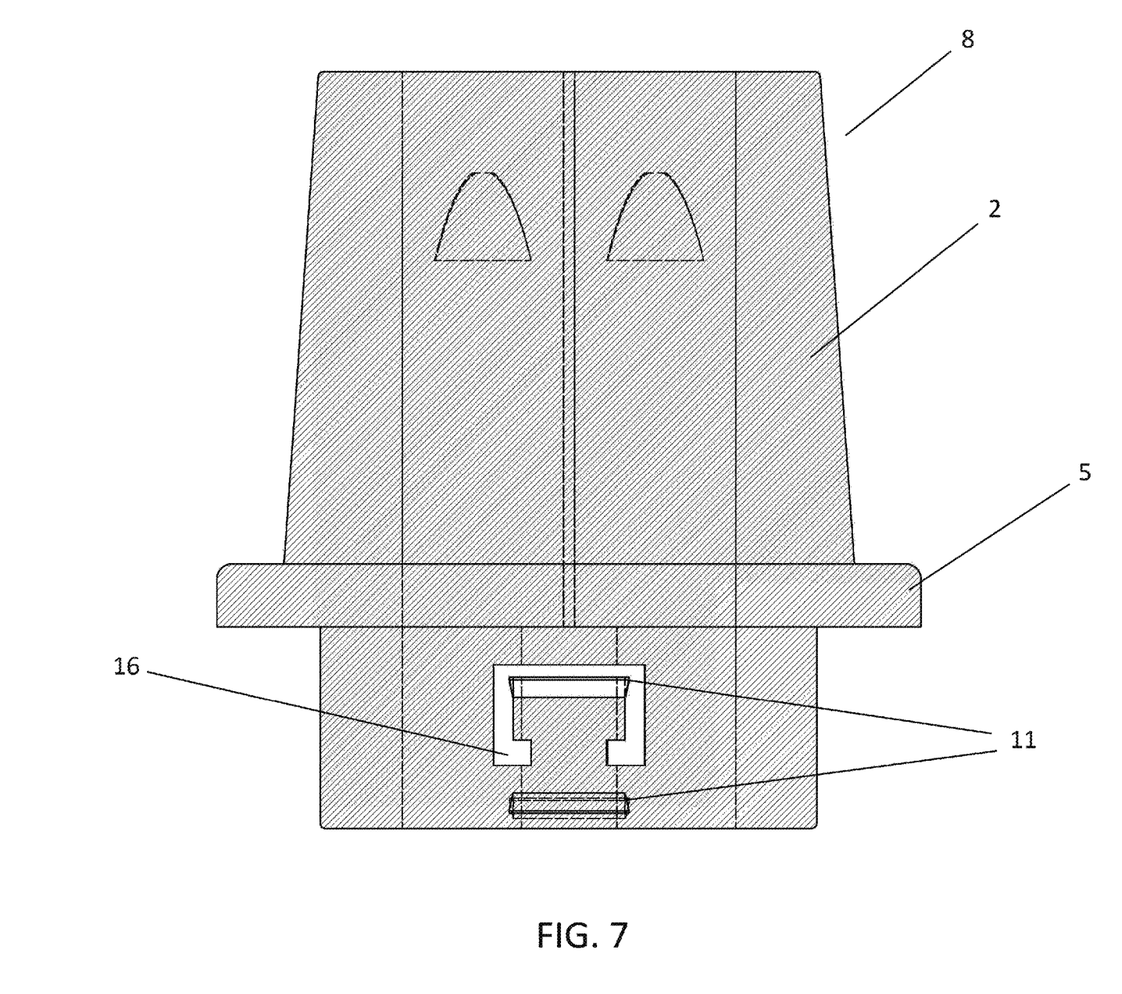
FIG. 7 is a side view of an embodiment of the connector.

FIGS. 6 and 7 show the exterior features of the connector in more detail. Located on the exterior of the connector body 2, there is at least one incision 9 running lengthwise along the longitudinal axis of the exterior of the connector body 2. In a preferred embodiment, one or more incisions 9 are located in the exterior of the connector body 2 near the feed end 8 of the connector body 2. These incisions 9 make the body 2 of the connector more flexible when a user inserts one or more wires (not shown) into the connector body 2.

FIGS. 6 and 7 also show an embodiment in which there are two sets of exterior protrusions 11 extending outward from the exterior of the connector body 2. Since it is common for electrical housings made of different materials to have different widths, the connector body 2 can be equipped with exterior protrusions 11 located at varying distances from the flange 5 such that one connector can be used with housings made of different materials. In addition, one or more sets of exterior protrusions 11 can be located above a cavity 16 such that when downward pressure is applied to the exterior protrusions 11 such as when the connector body 2 is being inserted through the housing 13 (not shown), the exterior protrusion(s) 11 located over the cavity 16 can be pressed down into the cavity 16. Doing so will facilitate pushing the exterior protrusion 11 located over the cavity 16 out of the way during insertion into the housing 13. For example, when installing the connector into a plastic housing (not shown) the exterior protrusion 11 that is/are closest to the flange 5 can be pushed down into the gap by the housing (not shown) so that the second exterior protrusion 11 is in position to contact the inside of the housing 13 opposite the point where the flange 5 contacts the outside of the same housing 13. The concerted action of the exterior protrusions 11 and the flange 5 secures the connector body 2 to the housing.

Finally, an alternate embodiment contemplated by the inventor uses different sizes of cables but is otherwise structurally identical to the above described embodiments. For example, the interior channel 3, grooves 6 and the space 15 can be altered to accommodate and secure cables of other sizes or gauges—for example, the inventor specifically contemplates a connector that securely holds one or two 12/2 AWG cables and a single 10/2 AWG cable.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An electrical connector that fits into a knockout featured by an electrical housing comprising:

a body with an interior channel running the length of the longitudinal axis of the body;

wherein the interior channel features at least two protrusions that define at least two grooves within the interior channel; and said grooves are each shaped to encircle and snugly secure a flattened cable of a first gauge inserted in a first orientation.

2. The electrical connector of claim 1 further comprising a space defined by the at least two protrusions, said space being shaped to accept and snugly secure a flattened cable of a second gauge inserted separately in a second orientation, the second orientation being accessible by rotating the body around its longitudinal axis.

3. The electrical connector of claim 1 wherein the electrical connector is sized to fit into a ⅜ inch knockout.

4. The electrical connector of claim 3 further comprising a flange around an exterior circumference of the body and at least one protrusion extending outward from the exterior surface of the body at one end of the body in a spaced relationship to the flange.

5. The electrical connector of claim 4 further comprising:

at least one longitudinal incision traversing the connector body from the interior channel to an exterior surface of the body and extending from an end of the body opposite the protrusion extending outward from the exterior surface of the body in a spaced relationship to the flange; and a cuff having a diameter equal to or less than the diameter of the exterior surface of the body configured to fit over and compress a portion of the exterior surface of the body containing the longitudinal incision.

6. The electrical connector of claim 5 further comprising teeth featured in the interior channel, the teeth being configured to grip a cable inserted into the interior channel of the connector body.

7. The electrical connector of claim 3 wherein the first gauge of cable is 14/2 AWG cable and the second gauge of cable is 12/2 AWG cable.

8. The electrical connector of claim 3 wherein the first gauge of cable is larger than a 14/2 AWG cable and the second gauge of cable is larger than a 12/2 AWG cable.

9. The electrical connector of claim 1 wherein the first gauge of cable is 14/2 AWG cable and the second gauge of cable is 12/2 AWG cable.

10. The electrical connector of claim 1 wherein the first gauge of cable is larger than a 14/2 AWG cable and the second gauge of cable is larger than a 12/2 AWG cable.

11. A non-metallic push-in connector for use in residential wiring comprising:

a body with an interior channel running the length of the longitudinal axis of the body; wherein the interior channel is shaped to encircle an exterior surface of and thereby secure two flattened electrical cables of a first gauge inserted in a first orientation; wherein the interior channel further features a space that snugly secures a cable of a second gauge inserted separately from the cable of the first gauge in a second orientation made accessible by rotating the connector body about a longitudinal axis;

a flange around the exterior circumference of the body;

at least one protrusion extending outward from the exterior surface of the body at one end of the body in a spaced relationship to the flange;

at least one longitudinal incision traversing the connector body from the interior channel to the exterior of the connector body and extending from the end of the body opposite the protrusion extending outward from the exterior surface of the body in a spaced relationship to the flange; and a cuff having a diameter equal to or less than the diameter of the exterior surface of the body; and teeth featured in the interior channel, the teeth being configured to grip a cable inserted into the interior channel of the connector body.

12. The non-metallic push-in connector of claim 11 wherein the first gauge of cable is 14/2 AWG cable and the second gauge of cable is 12/2 AWG cable.

13. The non-metallic push-in connector of claim 11 wherein the first gauge of cable is larger than a 14/2 AWG cable and the second gauge of cable is larger than a 12/2 AWG cable.

* * * * *